May 31, 1966  M. ROUANET  3,253,801

MECHANICAL MOVEMENT

Original Filed April 29, 1960  2 Sheets-Sheet 1

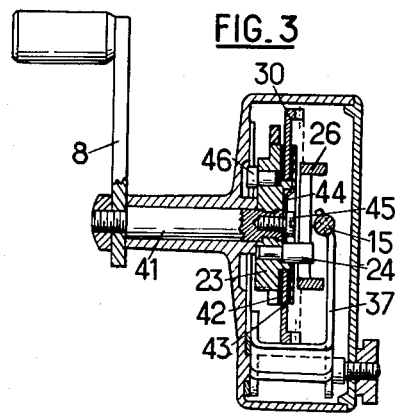
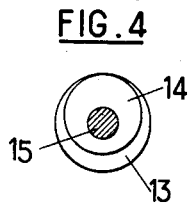
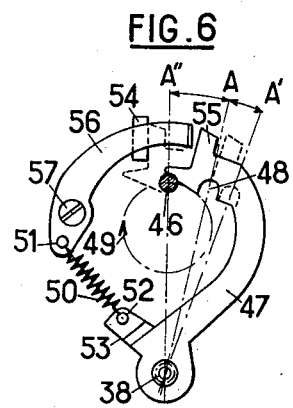
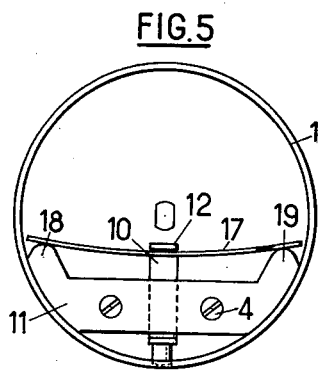
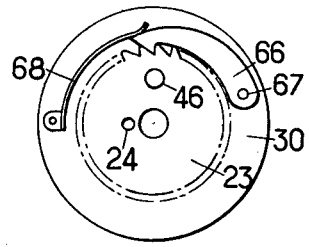
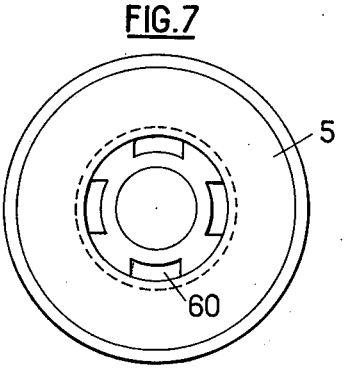

United States Patent Office 3,253,801
Patented May 31, 1966

3,253,801
MECHANICAL MOVEMENT
Michel Rouanet, 27 Rue des Girondins,
Saint-Cloud, France
Original application Apr. 29, 1960, Ser. No. 25,607, now Patent No. 3,141,629, dated July 21, 1964. Divided and this application Apr. 27, 1964, Ser. No. 362,605
Claims priority, application France, June 9, 1959, 796,976, Patent 1,236,565
7 Claims. (Cl. 242—84.21)

The present application is a divisional application of the application dated April 29, 1960, Serial No. 25,607, now Patent No. 3,141,629.

The present invention relates to a mechanical actuating device which provides both rotary and reciprocating motion. The invention is described in use with a specific fishing reel having a line drum or spool which does not rotate during the bait casting operation but allows line to pay out from the spool. In such reels when the line is retrieved a pick-up guides the line onto the spool, and either the pick-up or the spool may be rotated to wind the line on the spool.

The actuating device of the present application will find use in many other specific reels, and also in other devices especially where there is a need to condition the rotary element, whether reciprocated or not by forward rotation of the handle, the conditioning being effected by a reverse rotation of the handle.

The object of the present invention which is illustrated in a fishing reel is to provide reels generally with a valuable actuator.

A further object is to provide an actuator for any sort of device which may require a conditioning of an element which may be effected by reverse rotation of a driving shaft.

The embodiment is described hereunder, and shown in the annexed drawings, in which.

Figure 1:
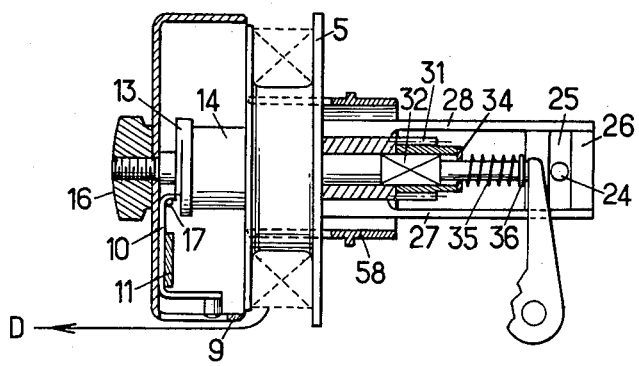
FIGURE 1 is a partial axial section, the spool being shown in elevation.
Figure 2:
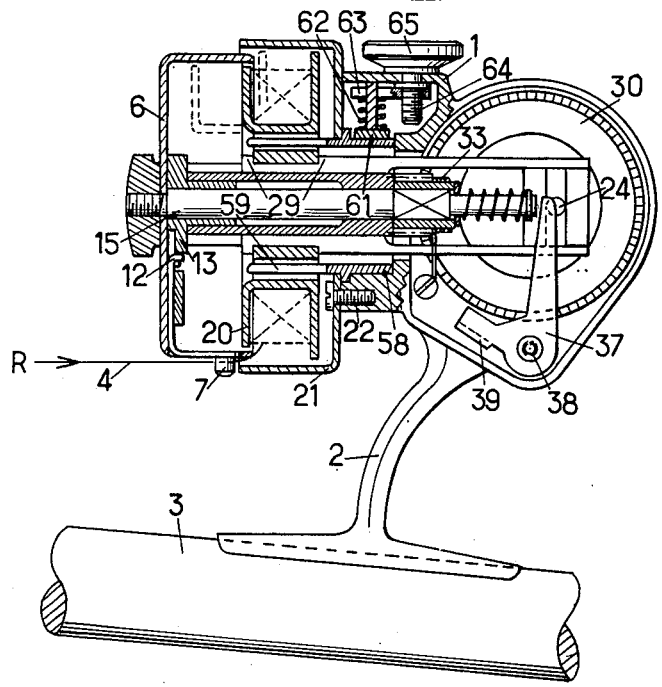
FIGURE 2 is an axial section of the reel in winding condition.

FIGURE 3 is a section through the axis of the crank, looking to the right in FIGURE 2, FIGURE 4 is a detailed drawing of the cam element 13 of FIGURE 2, FIGURE 5 shows the pick-up return device shown in elevation. This is a view of element 6 of FIGURE 1 looking toward the left, FIGURE 6 shows details of the mechanical movement, FIGURE 7 represents the spool and its hub shown in elevation, and FIGURE 8 shows the drive connection between hub 23 and gear 30.

The housing of the reel is generally designated 1, with a support 2 through which the reel is fixed to a fishing rod 3 that is parallel to the axis of the reel. The line 4 is wound on or unwound from spool 5. Such spool, as the line is rewound, performs a reciprocating motion of translation. Both remote positions are shown in FIG. 2, one being represented by a dotted line. Such conventional motion is performed in order to distribute the line evenly on the spool in rewinding. The shell-shaped pick-up holder of flyer 6, fixed in front of the spool, holds a pick-up 7, which causes the line to be rewound on the spool when flyer 6 is rotated. Flyer 6, by translation, may be shifted to either position represented in FIGS. 1 and 2, respectively, as will be explained below. The usual hand crank 8 controls on one hand the motion of translation of the flyer when the handle is rotated through a limited angle in one direction, and on the other hand provides for the alternate motion of spool 5, and simultaneously the rotation of flyer 6, when the hand crank is actuated in the reverse direction.

The previous information should be considered as known in the art and representing the type of reel which mechanism is improved by the invention in the description to follow.

According to the invention the pick-up device comprises a knob 7 which may retract or protrude relative to the external surfaces of the cylinder flange or ring 9 of flyer 6 through a hole provided in such flange. For that purpose, knob 7 is fixed on a bent support 10 which is slidingly guided by the inner face of the flyer and by a plate 11 secured on such face. The end 12 of support 10 is bent to provide a shoulder which is pressed by spring 17 on a camming surface of and excentered relatively to socket 14, rigid with housing 1, or formed by the end of this socket.

The flyer 6 is fixed on the end of shaft 15 by a nut 16. Shaft 15 moves freely in translation and rotation relative to socket 14, so that, in accordance with the position of the flyer (FIGS. 2 or 3), shoulder 12 of support 10 is engaged or disengaged by the cam. The result of such arrangement is that the protruding end of pick-up 7 out of flange 9 is controlled by the relative motion of translation of shaft 15 relative to socket 14, and by a limited rotation of the shaft.

A leaf or wire spring 17 which bears near its ends on two projecting ends 18, 19 of plate 3 secured to flier 6 (FIG. 5), actuates shoulder 12 in order to cause inward radial movement of the pick-up when permitted by the position of the camming surface (position of FIG. 1).

The line is hooked by the knob 7, in protruding position, FIG. 2; and this is made easier due to the cover 21 fixed by a screw 22 in front of housing 1, which delimits the ring shaped clearance through which the line may escape; the pick-up 7 extends across said clearance, when the flyer rotates in the rewinding motion.

Spool 5 is alternately moved by the following mechanism: hub 23, which rotation is controlled by hand crank 8, is fitted with a spur 24 which fits into a slit 25 of a cap 26 bearing two arms 27, 28 sliding into grooves of socket 14, which forms a hub on which spool 5 may freely move. Arms 27, 28, by two shoulders 29 protruding out of the guiding grooves, insert spool 5 in each side, so that this spool is controlled in translation by arms 27, 28 while it may still rotate relative to socket 14.

The rotation of flyer 6 is provided from a toothed wheel 30 by a hollow pinion 31, which is fitted inside by a part of square section of shaft 15, which thus is rotated, but remains free in translation. According to a practice common in the art, a spiral torsion spring 33 coiled on the hub of pinion 31 is used to allow the rotation in a sole direction, here the direction corresponding to the rewinding of the line.

Pinion 31 is secured on one hand by a shoulder ring of socket 14 and on the other hand by a ring 34 upon which presses coil spring 35 on shaft 15, which diameter is reduced beyond section 32. On the other hand, the coil spring rests on ring 36, keyed on shaft 15.

The axial movement of shaft 15 is caused by bent lever 37 swivelling on 38 and having a bent portion 39 forming a shoulder. Said shoulder is operatively connected with hand crank 8 through an escapement mechanism, pointed out in the description to follow.

The gear wheel 30 which is centered on the rotation axis of hand crank 8 is mounted to rotate freely on hub 23 keyed on the shaft 41 of the crank 8. The hub 23 is operatively connected for rotation with wheel 30 by means of a friction device including two friction washers 42, 43, pressed by the laminated or disk spring 44, which itself is secured by a screw 45 is shaft 41. Washer 42 is inserted between hub 23 and wheel 30, washer 43 is inserted between wheel 30 and spring 44, the latter presses the assembly, whereby the washers frictionally grip the wheel 30. To give a positive drive between hub 23 and gear 30 in the reeling-in direction of rotation a pawl 66 may be used mounted on gear 30 by pivot 67 and pressed by a spring 68 against ratchet teeth on the edge of hub 23, in which case it will be noted that as reverse rotation of hub 23 is effected, pawl 66 clicks over the ratchet teeth of hub 23. Gear 31 is held stationary because when it and gear 30 are biased in the reverse direction of rotation of crank 8 by the friction drive between hub 23 and gear 30 clutch 33 prevents reverse rotation of gear 31.

Upon rotation of crank 8 in the reeling-in direction, lever 47 and therefore lever 37 are moved to release the shaft 15 for movement toward reeling-in condition as it is biased to do by spring 35. The inner end of pick-up 12 moves toward the spool and is engaged by the eccentric cam 14 and so is forced radially out-wardly until it rides on the concentric portion 13 of the cam element. It will be noted that the crank 8 will always be in the same position with respect to the fishing pole whenever the reel is conditioned for casting.

Thus the rotation of flyer 6 is insured in the rewinding owing to the friction device but because spring 33, though the hand crank may be operated in the reverse direction, the flier cannot be reversed, and gear 30 will not reverse in rotation.

Pin 46 is supported at the rear of hub 23 and its function is illustrated by FIG. 6 (see section line 6—6 of FIG. 3). Such pin cooperates with a one-direction escapement device, composed of an anchor 47, oscillating on axle 38. A slot 48 is provided in such anchor and is designed to hook pin 46 when it runs in the opposite or reverse direction of arrow 49 and it is shaped in order not to disturb the rotation of pin 46 in the direction of arrow 49 which is the forward direction corresponding to the rewinding. Anchor 47 is returned in median position A, represented by a line, by spring 50, one end of which is secured in 52, on shoulder 53 of anchor 47.

Anchor 47 may be driven, when the crank is turned in the reeling-in direction by the pin 46 into position A', and in the other direction to position A", positioned by a stop 54. Position A' of FIG. 6 corresponds to the winding in position, represented in FIG. 2 of the knob 7 of the flier 6 and of the lever 37. Position A" of FIG. 6 corresponds to the casting position, represented in FIG. 1, of knob 7 and of lever 37. In the displacement A", anchor 47, through its shoulder 55, fits under the end of spring 56, composed of a blade which is slightly bent. Such spring is secured to the housing at 57 and holds the anchor and thus pin 46 in position A", such locking being overcome only by rotation of the hand crank providing the rotation of pin 46 in the direction of arrow 49.

During the displacement A' to A", shoulder 53 of the anchor operates on shoulder 39 of lever 37, that is, a on-direction connection to press against shoulder 39 to rotate lever 37 anti-clockwise in FIGURE 1.

It will be noted that the anchor 47 would operate with pin 46 to displace shaft 15 axially upon reverse rotation of the handle 8 regardless of what sort of device is secured to the remote end of shaft 15, or what sort of device is reciprocated by movement of arms 27 and 28.

Crank pin 24 which. operating in slot 25 of element 26, causes the reciprocation of the spool as the flier is rotated, is positioned so that when the pin 46 is turned through the angle A', A to A" the spool 5 is placed in its most rearward position. So it will be seen that in casting condition the flier 6 is positioned as far forward as possible, and the spool 5 is positioned as far to the rear as possible to assure free flow of the line from the spool.

The braking system prevents normally the spool 5 from rotating, but allows the same to rotate, hence, the line to pay out from the spool as may be necessary to keep the fish from breaking the line. This conventional braking is performed by improved means, including a drum 58, which is solid in rotation with the spool, by means of four stems such as 59 engaging slidably four corresponding holes 60 provided within the hub of the spool, as shown in FIG. 7. The shoe 61 of the brake rubs against the outer face of the drum, and is pressed by spring 62, the other end of which rests on a tappet 63 moving on the guiding rod of the spring, such tappet being solid with a nut in which fits screw 64, driven by knob 65. Thus it is possible to regulate the tension of spring 62, which is generally set slightly within the line rupture.

The operation has been explained in the description above. It will, however, be completely explained again in the following description. In the rewinding position, FIG. 2, it may be seen that the rotation of the crank insures the rotation of the flyer 6 through wheel 15 and pinion 31 while the alternate motion of the spool is insured through hub 23, spur 24 and cap 26. The line is seized by pick-up 7 and rewinds evenly.

Once the line is rewound and for a new cast, the fisherman turns crank 8 in reverse direction relative to the winding-in direction, until a resistance is felt as anchor 47, driven by pin 46, is stopped by stop 54. In such motion, shoulder 53 of anchor operates shoulder 39 of lever 37, which pushes shaft 15, thus driving pick-up holder 6 in the position of FIG. 1, in which support 10 is not stopped any more by cam 13 and is returned by spring 17, thus retracting pick-up 7 inside the flyer 6. As spool 5 is completely free, it is possible to cast easily.

To take back the line, the fisherman runs the crank in the direction of the rewinding. Pin 46 takes anchor 47 back into position A', thus releasing lever 37. Flyer 6 comes back to the right hand side owing to spring 35. Cam 13 inserts shoulder 12 of support 10, thus providing the protruding of pick-up 7 out of the flyer, which can now seize the line.

What I claim is:

1. An actuator for a device requiring a rotary motion and a reciprocating motion, said device including:
   a frame;
   a rotary driving shaft mounted on said frame including a hub carrying an eccentric pin and having peripheral gear means mounted thereon;
   a crank pin mounted on the hub portion of said driving shaft;
   reciprocating means slidably mounted on said frame engaging said crank pin;
   a rotary driven shaft having a gear means mounted thereon to drivingly engage the gear means on said driving shaft;
   anchor means pivotally mounted on said frame for swinging movement about a fixed axis parallel to the axis of said driving shaft located at a point remote from said driving shaft;
   fixed stop means engageable by said anchor means at one extremity of its pivotal movement;
   said anchor means including means engageable by said eccentric pin when said rotary driving shaft is operated in one direction of rotation to pull said anchor means toward the axis of said driving shaft and against said stop means;
   a cam surface on said anchor means engageable by said eccentric pin upon operation of said driving shaft in the other direction of rotation to push said anchor means away from the axis of said rotary driving means and away from said stop means;
   whereby the rotation of said driving shaft is limited by said stop means when said driving shaft is rotated in said one direction of rotation but is not limited when rotated in the other direction.

2. The actuator as set forth in claim 1 in which elastic detent means are disposed in the vicinity of said stop means to resiliently maintain said anchor in the position in which said anchor has been stopped by said stop means when said anchor has been pivoted by said eccentric pin when rotated in said one direction.

3. The actuator as set forth in claim 1 in which said driving shaft means includes friction means between said hub and said peripheral gear means.

4. The actuator as set forth in claim 1 in which supplementary means are provided to prevent the rotation of the driven shaft in the direction corresponding to the rotation of said driving shaft in said one direction.

5. The actuator as set forth in claim 1 in which said rotary driven shaft, having an axis, is mounted for translatory movement in the direction of said axis, and which includes a lever pivoted for angular displacement about an axis parallel to said driving shaft, and operatively connected to said driven shaft and to said anchor to cause a translatory movement of said driven shaft in response to a pivotal movement of said anchor.

6. The actuator as set forth in claim 5 in which said lever is disposed to encounter one extremity of the driven shaft in its axis of rotation.

7. The actuator as set forth in claim 5 in which said lever is disposed to be pivoted by said anchor only when said anchor pivots in response to rotation of said driving shaft in said one direction.

References Cited by the Examiner

UNITED STATES PATENTS

| | | | |
|---|---|---|---|
| 2,600,558 | 6/1952 | Mauborgue | 242—84.21 |
| 2,828,088 | 3/1958 | Denison et al. | 242—84.2 |
| 3,033,486 | 5/1962 | Wood | 242—84.21 |
| 3,141,629 | 7/1964 | Rouanet | 242—84.21 |

MERVIN STEIN, *Primary Examiner.*